United States Patent
Rutz et al.

(10) Patent No.: US 8,894,323 B2
(45) Date of Patent: Nov. 25, 2014

(54) METHOD AND ROAD PAVER FOR LAYING DOWN A PAVEMENT

(75) Inventors: Arnold Rutz, Ludwigshafen (DE); Martin Buschmann, Neustadt (DE); Achim Eul, Mannheim (DE); Ralf Weiser, Ladenburg (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 0 days.

(21) Appl. No.: 13/448,952

(22) Filed: Apr. 17, 2012

(65) Prior Publication Data

US 2012/0263532 A1    Oct. 18, 2012

(30) Foreign Application Priority Data

Apr. 18, 2011 (EP) .................................. 11003245

(51) Int. Cl.
  *E01C 23/00* (2006.01)
  *E01C 19/48* (2006.01)
  *B60W 10/00* (2006.01)
  *E01C 19/00* (2006.01)

(52) U.S. Cl.
  CPC ............... *E01C 19/48* (2013.01); *E01C 23/00* (2013.01); *B60W 10/00* (2013.01); *E01C 19/00* (2013.01)
  USPC ........ 404/84.05; 404/84.1; 404/118; 709/219

(58) Field of Classification Search
  CPC .............................. B60W 10/00; E01C 23/00
  USPC .......................... 404/84.05–85, 118; 709/219
  See application file for complete search history.

(56) References Cited

U.S. PATENT DOCUMENTS

| | | | | |
|---|---|---|---|---|
| 5,921,708 | A * | 7/1999 | Grundl et al. | 404/84.1 |
| 6,749,364 | B1 * | 6/2004 | Baker et al. | 404/84.5 |
| 7,144,191 | B2 * | 12/2006 | Kieranen et al. | 404/84.1 |
| RE39,834 | E * | 9/2007 | Kieranen et al. | 404/84.5 |

(Continued)

FOREIGN PATENT DOCUMENTS

| | | |
|---|---|---|
| DE | 10151942 B4 | 12/2005 |
| DE | 602004011968 T2 | 3/2009 |

(Continued)

OTHER PUBLICATIONS

EP Search Report mailed Oct. 25, 2011, which issued in corresponding EP Application No. EP11003245.

(Continued)

*Primary Examiner* — Raymond W Addie
(74) *Attorney, Agent, or Firm* — Fish & Richardson P.C.

(57) ABSTRACT

Method for laying down a pavement with a road paver, in which machine parameters are coordinated at least with paving requirements of the pavement by means of a controller and in which at least one machine parameter set is created and stored in advance for a paving requirement determined before the paving, the parameter set allowing a high level of machine efficiency and pavement quality to be expected and/or has already produced the same for an at least similar earlier paving requirement of an already laid down pavement, and the pavement on the basis of the parameter set created in advance. The road paver has a controller with an on-board computer connected to a sensor system and an actuating system, and includes memories and a retrieval and/or comparison section for triggering the actuating system for implementing the machine parameters of the parameter set created in advance.

9 Claims, 2 Drawing Sheets

(56) References Cited

U.S. PATENT DOCUMENTS

| | | | |
|---|---|---|---|
| 7,856,302 B2 * | 12/2010 | Rasmussen | 701/50 |
| 7,938,595 B2 * | 5/2011 | Potts et al. | 404/84.1 |
| 7,946,788 B2 * | 5/2011 | Jurasz et al. | 404/84.8 |
| 7,984,184 B2 | 7/2011 | Woon et al. | |
| 8,282,312 B2 * | 10/2012 | Braddy et al. | 404/84.05 |
| 8,308,395 B2 * | 11/2012 | Jurasz et al. | 404/84.8 |
| 8,371,769 B2 * | 2/2013 | Worsley et al. | 404/84.2 |
| 8,388,263 B2 * | 3/2013 | Fritz et al. | 404/84.2 |
| 2002/0059320 A1 | 5/2002 | Tamaru | |
| 2006/0045620 A1 | 3/2006 | Olson et al. | |
| 2007/0044088 A1 | 2/2007 | Eul | |
| 2007/0050137 A1 * | 3/2007 | Woon et al. | 701/219 |
| 2010/0111605 A1 * | 5/2010 | Sturos et al. | 404/117 |
| 2010/0196096 A1 * | 8/2010 | Halonen et al. | 404/84.1 |
| 2010/0215433 A1 * | 8/2010 | Fritz | 404/84.5 |
| 2011/0229264 A1 * | 9/2011 | Weiser | 404/72 |
| 2012/0288328 A1 * | 11/2012 | Minich | 404/72 |
| 2012/0321385 A1 * | 12/2012 | Hanfland | 404/84.1 |

FOREIGN PATENT DOCUMENTS

| | | |
|---|---|---|
| EP | 1755008 A1 | 2/2007 |
| EP | 1544354 A3 | 11/2007 |
| JP | 10207544 A | 8/1998 |
| JP | 2000110111 A | 4/2000 |
| JP | 2011047214 A | 3/2011 |

OTHER PUBLICATIONS

A European official communication mailed Jan. 28, 2013, which issued in corresponding EP Application No. 11 003 245.5.

An English translation of Japanese Office Action mailed Jul. 2, 2013, which issued in corresponding Application No. 092127.

* cited by examiner

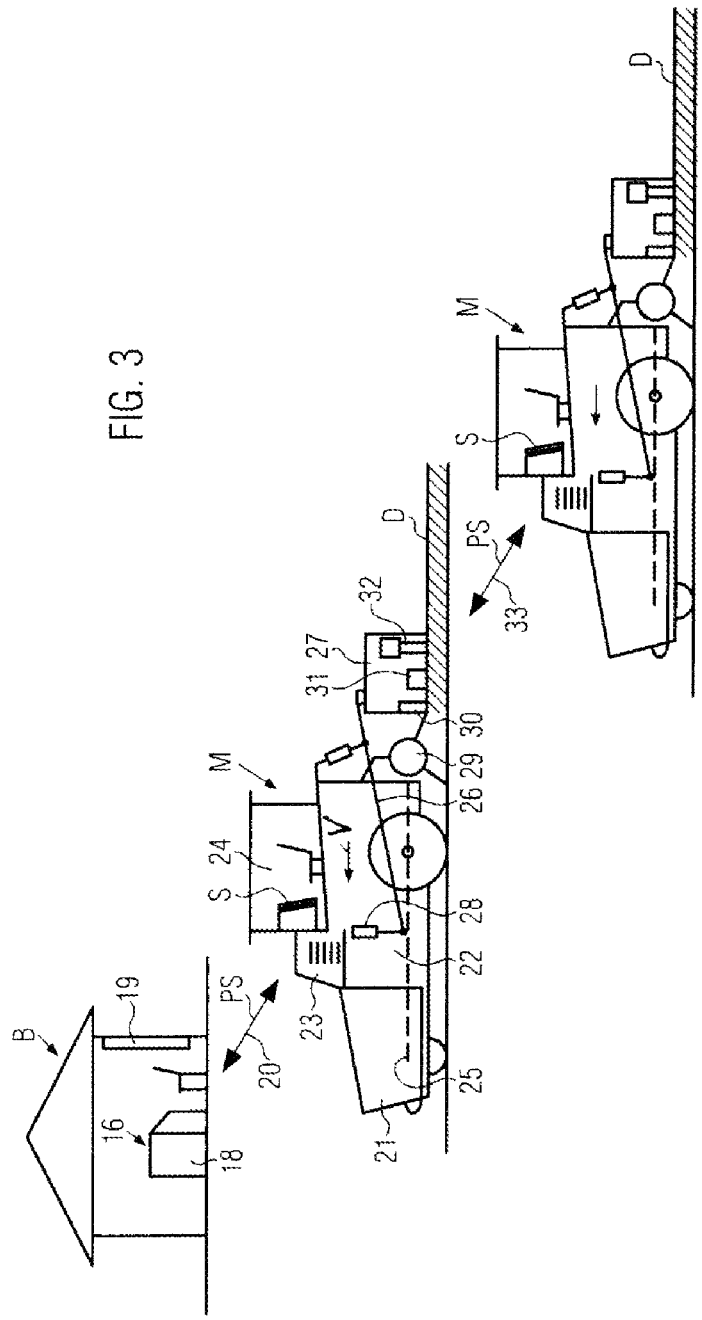

METHOD AND ROAD PAVER FOR LAYING DOWN A PAVEMENT

BACKGROUND OF THE INVENTION

The invention relates to a method for laying down pavement and to a road paver for use in the pavement laying operation.

In order to lay down a high quality pavement in road construction in a largely error-free and effective manner, precise machine adjustments are required on the road paver and its screed. Incorrect adjustments may possibly mean high costs for reworking and/or material. For example, in the case of the incorrectly produced profile on a pavement with a transverse gradient profile, it may be necessary to lay down an excessive quantity of paving material or to remove the incorrect profile again and replace it. It is customary for the personnel at the site to adjust the machine parameters and set up the road paver accordingly, whereby the efficiency of the road paver and the quality of the pavement that is then laid down depend on the experience of the personnel, and it takes some time to achieve reasonably satisfactory efficiency and pavement quality during the laying process. In addition, there is also a high expenditure of time for the setup process because a multitude of different machine parameters have to be adjusted and machine parameters can have an enduring effect on one another.

These are some of the reasons that have led to the development of a trend for construction site management in which modern possibilities of data processing and data communication are used in order to optimise the machine efficiency and pavement quality.

An information exchange system for construction sites is disclosed in German patent DE 60 2004 011 968 T. Data for the guided driving of the construction vehicles is exchanged between mobile construction site vehicles and a planning office using, for example, an Internet protocol.

A construction machine management system in which construction machines communicate with one another and with a planning office is disclosed in German patent DE 101 51 942 B. The communicated data comprise, for example, theft information, project costs, part and material requirement predictions, maintenance requirement predictions, weather data or fuel consumption data, without, however, including machine parameters that, for example, a road paver would need especially for efficient operation and for manufacturing a high-quality pavement.

SUMMARY OF THE INVENTION

The basis of the invention is formed by the object of improving a method for laying down pavement at a construction site using a road paving machine and a road paver to the effect that optimised machine efficiency and high-quality pavements are made possible. In particular, part of the object is to be able to swiftly carry out the setup of a road paver largely independently of the experience or undesired influences of the personnel on the road paver, so that the paving process can be carried out as rapidly as possible with a high level of efficiency and so that as much as possible, a high quality pavement that corresponds to the specifications of the construction site is laid down from the start of the paving.

The stated object is solved in terms of the method and device of the present invention.

By creating at least one set of machine parameters in advance and implementing these parameters during the setup of the road paver, a high level of machine efficiency is achieved as well as success in depositing pavement having a predetermined pavement quality and/or has resulted in such machine efficiency and quality in the case of an at least similar, earlier paving requirement. Accordingly these machine parameters of the parameter set that was created in advance of the paving operation are important for achieving improved machine efficiency and pavement quality. Also, the setup of the road paver is significantly simplified and no time is wasted for trial-and-error endeavours, and there is no considerable need to fall back on possibly non-existent experience on the part of the operating personnel of the road paver. The personnel creating the parameter set in advance have sufficient experience and can access not only comprehensive information regarding the paving requirements, but possibly parameter sets that produced a high level of machine efficiency and pavement quality in the case of at least similar earlier paving requirements of an already laid pavement. In this way at least it is possible to save the first steps for finding machine parameters that are only somewhat suitable anyway.

In the road paver, the key machine parameters are immediately adjusted correctly in the controller or on-board computer on the basis of the parameter set that was created in advance, in order to make it possible to start the paving operation promptly with a high level of machine efficiency and high level of pavement quality and to permit the paving to proceed swiftly. If particular basic settings already exist, the corresponding actual machine parameters are determined, for example, by means of a sensor system, and compared to the machine parameters of the parameter set that was created in advance, and the machine parameters of the parameter set that was created in advance are implemented by activating the actuating system. The parameter set for pre-adjustment can thereby be created and implemented on the road paver or at a creation point at which sufficiently meaningful information is available in order to create the parameter set as appropriately as possible and then either input the set into the on-board computer of the road paver or transfer it there. Documented data or data records are accessed thereby. Because documented information on the paving requirements of the pavement at the construction site is not necessarily available on the road paver and extensive comparisons must be carried out in order to create the parameter set in the most appropriate way possible, it is expedient, for example, to create the parameter set in a planning office and to transfer to that office the actual machine parameters, as well as to transfer them from the planning office to the road paver or to a plurality of road pavers working at the construction site during the planning of similar or identical pavements or construction projects in order to guarantee effective machine use.

For this reason, in an expedient embodiment of the method the parameter set is created in advance on the basis of known and/or acquired construction site specifications and/or paving requirements. The parameter set is preferably created in a planning office that is fully informed with regard to the construction site specifications and/or paving requirements or with regard to parameter sets that were previously documented as usable.

A parameter set that is created in advance and implemented on the road paver by means of its pre-adjustment can expediently be individually modified and saved again and/or documented on the road paver, for example, on the basis of a review of the machine efficiency and/or pavement quality at the site, in order to obtain the largest possible selection of different proven parameter sets for further future construction projects.

It can furthermore be expedient in the case of a road paver if an implemented parameter set or individually modified, implemented parameter set is transmitted to at least one additional road paver, of the same type or at least similar, at the construction site. This can then be expedient in the event that a road paver breaks down and another has to take over the job of the first, or in the event that during the operation of a plurality of road pavers at the construction site one road paver works significantly more effectively or produces results with better quality than the others. These other road pavers can then, at least to a large extent, implement the transmitted parameter set of the road paver that paves more efficiently or better.

The parameter sets can be transmitted among the road pavers, for example, by means of a short range radio link (Bluetooth, W-LAN, Zigbee or the like) and/or by means of a central server (mobile, private mobile or satellite radio, etc.).

For the selection of especially advantageous parameter sets (best practice), these can be stored in the central server or in the controllers or on-board computers of the road pavers, so that they can be quickly retrieved and implemented at all times. The machine parameters of such parameter sets can even be properly administered in the central server. This results in significantly shortened setup times for the road pavers.

It can furthermore be expedient if comparisons are carried out on the parameter sets implemented directly or in a modified form and transmitted among the road pavers at the construction site or in each case transferred back to a planning office or a central server with reference to obtained information for the particular achieved machine efficiency and/or pavement quality, and in turn at least one optimised parameter set is determined for the given paving requirements and provided or stored and/or documented for other similar or identical road pavers for implementation in the case of the given paving requirement. This best practice principle is based, so to speak, on a self-learning effect or self-improvement effect of the system, and leads to optimal parameter sets.

It can furthermore be expedient to create in advance a plurality of different parameter sets and store them in a retrievable manner, preferably in the controller or the on-board computer of the respective road paver, or in an administration server that communicates with the road paver. In this way, an appropriate parameter set is retrievable and available quickly.

It can furthermore be expedient if an implemented and/or individually modified parameter set is transmitted from the road paver back to a parameter set creation and/or administration point for comparison and/or for documentation and/or further modification. Further optimisations can then be made there on the basis of more information that is available there and, immediately or later, an optimised created parameter set can be given back to the respective road paver.

A parameter set created in advance expediently defines at least one of the following machine parameters for implementation: the paving profile, including the paving height of the pavement and/or the paving width and/or settings of compacting units of a screed of the road paver and/or the rotational speed or speed of a longitudinal conveyor, preferably a scraper conveyor, and/or of a lateral distribution auger of the road paver and/or the paving work speed, however, no downtimes and/or waiting times. These machine parameters, of which at least one is defined in the data record, are decisive both for the machine efficiency and for the pavement quality under the given and known paving requirements.

It is furthermore expedient, however, to determine further machine efficiency and pavement quality performance figures for the machine parameters of the parameter set and to assign these to the parameter set in order to be able to bring about an improved optimisation of the machine effectiveness and pavement quality. Determined and assigned as machine efficiency performance figures are, for example, the mass throughput in paving material and/or the paving distance per day and/or the working time, including downtimes and waiting times and/or only the downtime and waiting time. The disintegration of the paving material on the delivery path to and in the road paver and/or the surface homogeneity and/or surface quality of the pavement and/or a uniform paving work speed and/or downtimes and waiting times as they inevitably result in actual operation can be determined and assigned to the parameter sets as pavement quality performance figures.

Furthermore, for further optimisation of the respective created parameter set, it can be expedient to provide this parameter set with basic information that simplifies the assignment and retrieval of the parameter set and that can comprise at least the road paver type and/or the screed type and/or an assigned parameter set name and/or an intended purpose.

In the simplest case, the machine parameters of the parameter set that is created in advance are manually input and stored in the road paver, so that they can be manually reviewed and output and displayed, and the road paver is manually set up with the specification of the machine parameters for the implementation of the machine parameters. In this way, the personnel on the road paver swiftly find the optimal adjustments.

Because as a rule certain basic adjustments may already have been made on the road paver, it can be expedient to acquire, for example by means of a sensor system on the road paver, the actual machine parameters for coordination with the machine parameters of the parameter set that was created in advance, and to take these into consideration in order to simplify the setup process.

Furthermore, implemented machine parameters of the created parameter set, possibly with modifications made at the site, are expediently stored in the road paver. These preferably relate to the most recently implemented machine parameters at the time.

In an especially expedient method variant, the parameters of the created parameter set are read out in the road paver and implemented by means of an actuating system, preferably hydraulically, and automatically, and are preferably correlated with the actual acquired machine parameters. As a result, the time expenditure for the optimised setup is further shortened. The paving work speed, the blade angle of the screed, the speed of the longitudinal conveyor in the road paver and the rotational speed of its lateral distribution auger can hereby, for example, by means of the actuating system, be correctly adjusted automatically, but also, for example, the frequency of a compacting unit in the screed formed as a tamper and/or of a vibration drive of a screed plate as a further compacting unit and/or, if present, the frequency and/or the hydraulic pressure of a further compacting unit of the screed, formed as a high compaction pressure bar system can likewise be correctly adjusted automatically. A corresponding controller for adjusting different height positions of pivot points of the draw bars of the screed for a pavement with a paving thickness that varies across the paving driving direction or a screed assist over lifting cylinders that act on the screed or the draw bars and the like can be included. Although the personnel on the road paver can monitor these adjustments that run automatically, they do not necessarily need to intervene.

In an expedient embodiment of the road paver, the controller or the on-board computer has a display for performance figures and/or machine parameters, whereby the display is connected at least to the memory for performance figures and to the main memory for the machine parameters of the parameter set that was created in advance.

In a further embodiment, a section for determining these performance figures can be assigned to the memory for determined and assigned performance figures.

At least the main memory is expediently connected to the input section and a sending/receiving section. Modifications can be carried out or the machine parameters of the parameter set that was created in advance can be input by means of the input section. At least the parameter sets that were created in advance can be downloaded in a wireless way or stored parameter sets or modified and stored parameter sets can be transmitted back in a wireless way by means of the sending/receiving section. In the case of an expedient embodiment, at least the sending/receiving section is linked to a telematics module in a manner that allows communication, whereby this telematics module is positioned separately from the road paver or is even arranged on the road paver. This module is expediently located in a planning office or an administration server.

BRIEF DESCRIPTION OF THE DRAWINGS

Embodiments of the object of the invention are explained on the basis of the drawings. Shown are:

FIG. 3 is a schematic view of a construction site, at which, for example, two road pavers are laying down pavements and to which a planning office is assigned.

Figure 1:
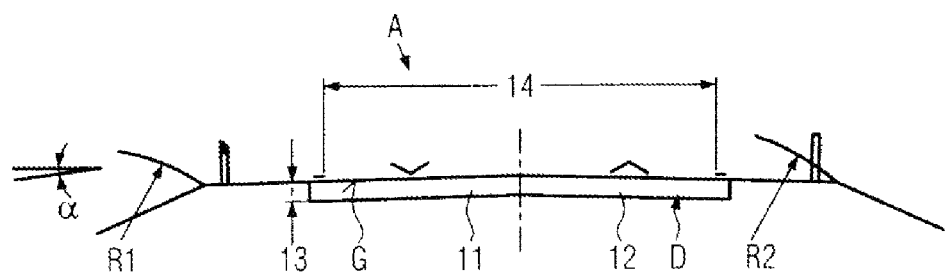
FIG. 1 depicts a cross-section of a pavement that is to be laid down at a construction site.

A pavement D in FIG. 1 that has to satisfy special paving requirements has a straight cross-section with two differently angled sections 11, 12 that abut against each other in the middle, —each with, e.g., a paving thickness 13, whereby the total paving width is indicated with 14. The pavement D is, e.g., transversely tilted at an angle α and can follow a curve progression R1, R2 with different radii. Furthermore, drains G or the like are optionally to be integrated into the pavement D at known positions. This pavement D is to be laid down with the greatest possible machine efficiency and a predetermined high quality that is as uniform as possible (evenness, surface quality, surface homogeneity, degree of compaction).

Figure 2:
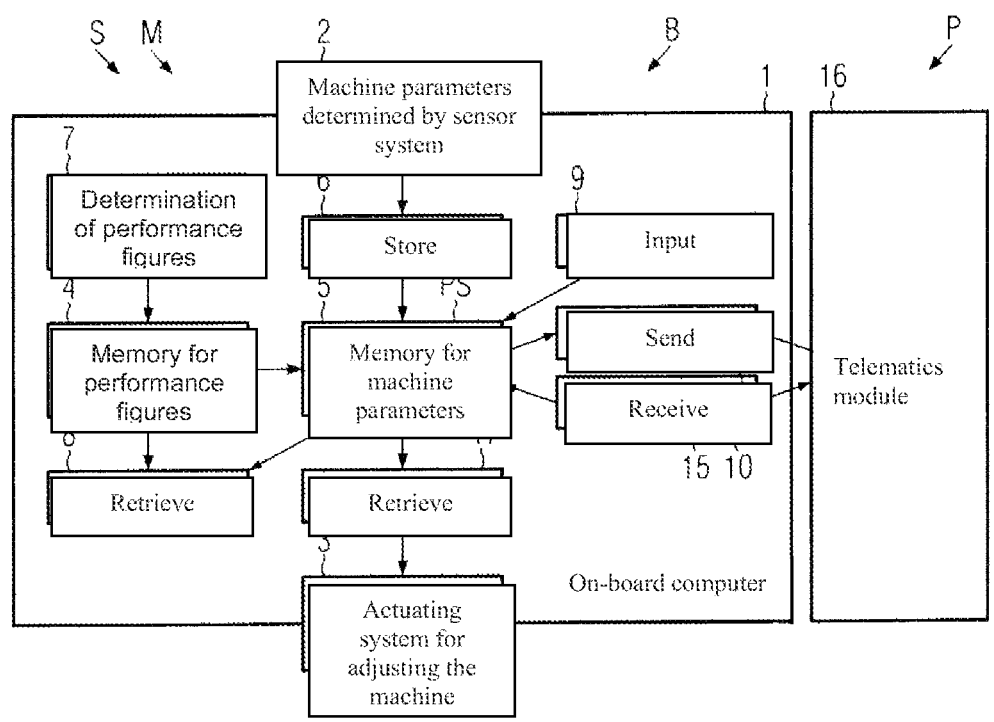
FIG. 2 depicts a diagram of an on-board computer of a road paver with associated telematics module.

For adjusting the road paver that lays down the pavement D and for the setup before the start of paving or during the start of paving, the road paver M indicated in FIG. 2 has an on-board computer 1 that is connected to a sensor system 2 and an actuating system 3 and that, for example, is designed with a telematics module 16 in a manner that allows communication. The memory 4 for performance figures (machine efficiency and pavement quality performance figures) is implemented in the on-board computer 1, whereby a section 7 for determining performance figures and a display section 8 are assigned to this memory. Furthermore, a main memory 5 for machine parameters of at least one parameter set PS of machine parameters that is created in advance is implemented, with a memory 6 for the actual machine parameters determined by the sensor system 2 upstream, and a retrieval section 17 for stored machine parameters downstream. The actuating system 3 is activated by means of the retrieval and, optionally, comparison section 17, whereby this actuating system adjusts, for example, hydraulically and as far as possible automatically, retrieved machine parameters on the road paver and/or its screed by way of implementation. An input section 9 is connected at least to the main memory 5 in order there either to input machine parameters or to carry out modifications. Furthermore, a sending/receiving section 10, 15 (optionally two separate sections) is provided that, e.g., can be used for communication in a wireless way with the telematics module or with another road paver or with a planning office or with an administration server (not shown). The telematics module can be implemented in a software version, either on the road paver or separated from the road paver.

For example, FIG. 3 illustrates a construction site A on which two road pavers M, M1 that are next to each other each lay down a pavement D or each lay down at least a portion of a pavement D. A planning office B can be assigned to the construction site A, whereby this planning office can be in a position to communicate with the road pavers M, M1 via a communication link, for example, via mobile or private mobile or satellite radio or via the Internet.

An administration server 18 can be arranged in the planning office B at a creation point 16 for parameter sets, and retrievable information, for example, regarding the construction site A, the pavement D, earlier projects, the development of the pavement and its specifications (see FIG. 1) is kept at hand at 19.

For example, a parameter set PS of machine parameters that are decisive for the machine efficiency and the pavement quality is created in planning office B in advance (before the paving starts) and transmitted to the respective road paver M, M1 or its on-board computer in the controller S via the communication link 20. The parameter set PS that was created in advance is either fashioned in such a manner that it also promises a high level of machine efficiency and good pavement quality for the paving requirements of the pavement known in the planning office B on the basis of the information available there, or the parameter set PS has already produced a high level of machine efficiency and pavement quality in the case of an at least similar earlier paving requirement of an already laid down pavement and is documented.

Alternatively, the parameter set PS used for the pre-adjustment of the road paver M, M1 during its setup can also be created and implemented on the respective road paver M, M1 or on a road paver M or M1. If the parameter set PS is created on a road paver M or M1 and implemented there, it is expediently transmitted to every other road paver via a communication link 33 in order also to be implemented there. The communication link 33 can be a short-range radio link (Bluetooth, W-LAN, Zigbee, or the like). Alternatively, each created parameter set PS could be brought to the road paver M, M1 by means of a portable computer and there downloaded into the on-board computer, or, for example, in the planning office B, stored on a USB stick or similar portable storage unit that is brought to the road paver M, M1 and plugged in there for transfer or updating. For the selective retrieval of especially advantageous parameter sets (best practice), these can also be stored in the road pavers. Additionally or alternatively, the parameter sets can be administered together, optionally with performance figures and basic information, on a central server, for example, the administration server 18 in the planning office B.

The road pavers M, M1 that have the same construction or that are at least similar to the greatest possible extent have, on a chassis 22, a paving material hopper 21, a primary drive unit 23, a drivers cabin 24 with the controller S, a longitudinal conveyor 25 from the hopper 21 to the rear end of the chassis 22, and, on the rear chassis end, a lateral distribution auger 29 for paving material that has been thrown out. A screed 27 is coupled to pivot points on the chassis 22 by means of draw bars 26, whereby the height of these points can be adjusted, for example, by means of levelling cylinders 28, and are used to adjust the working angle of the screed 27 and/or different paving thicknesses transverse to the work driving direction. The screed 27 is either a basic screed with a fixed paving width or an extendable screed (not shown) with extendable screed parts that can be displaced transversely for varying the paving width. At least one compacting unit is provided in the screed 27. In the embodiment shown, a compacting unit 30 is a tamper that works at the adjustable frequency and adjustable lift (lift: manually adjustable or adjustable by remote control) on the front end, as seen in the paving driving direction (paving driving speed V) of the screed 27. Furthermore, a screed plate, which is not further highlighted, on the underside of the screed 27 can bear a vibration device 31 (out-of-balance vibration device) and define a further compacting unit of the screed 27, whose frequency is adjustable. Optionally a high-compression pressure bar system with hydraulic pressure application in the vertical direction is furthermore also provided in the screed 27 as a further compacting unit 32.

Possible machine parameters of the parameter set PS that is created in advance can be: the paving profile of the pavement D (including the paving height 13), the paving width 14, settings of the compacting units 30, 31, 32, the speed or rotational speed of the longitudinal conveyor 25 and the lateral distribution auger 29, the paving work speed V, the height positions of the levelling cylinders 28, a possible screed assist and the like.

In order to optimise the machine efficiency and quality of the pavement D, it is furthermore helpful to determine machine effectiveness and pavement quality performance figures for the machine parameters of the parameter set PS that was created in advance, as, for example, the mass throughput of the paving material in tonnes per hour, the paving distance per day or work phase in meters per hour, whereby here this specification can also include downtimes of the road paver that are unavoidable during operation, as well as downtimes and waiting times in minutes or hours. These performance figures can, for example, be determined during the paving operation or earlier in comparable cases and assigned to the parameter set that is created in advance, for example, for documentation purposes, and also, in order to allow a better evaluation of the parameter set that is created in advance for later uses.

For example, the degree of the disintegration of the paving material on the delivery path from the mixer to the road paver and/or in the road paver and/or the surface homogeneity or surface quality, the uniformity of the paving work speed and/or the downtimes and waiting times during the paving can be determined as the pavement quality performance figures and assigned to the parameter set. Finally, basic information can also be assigned to the particular determined parameter set, whereby this information simplifies a later correct choice and favours the administration and documentation and can refer to the type of road paver, the type of screed, the type and/or performance of the compacting units in the screed, a name of the parameter set and an intended purpose.

In order to be able to evaluate this wealth of information for the creation of the particular appropriate parameter set and make comparisons, this step is preferably carried out in the planning office where not only are appropriately trained personnel available but also all necessary information can be retrieved centrally. For this purpose, the actual machine parameters that are determined on the road paver are also transmitted to the planning office, so that at a different construction site or during the planning of similar or identical construction sites the particular parameter set that was created in advance can be transmitted again to the road paver or to all road pavers in order to guarantee effective machine use for a high pavement quality level. The parameter sets should also be transmitted among the road pavers M, M1 at the construction site and stored in each case. This can be expedient in the event that one road paver breaks down and another has to take over its assignment, or when a plurality of road pavers are operated and one works significantly more effectively or produces results with better quality.

The particular parameter set that was created in advance for setting up or pre-adjusting the road paver M, M1 can be implemented in various ways. For example, the machine parameters are input and stored manually, whereby they can be manually read out and depicted on a display section at any time. The road paver is thereupon set up manually with consideration given to the stored machine parameters.

Alternatively, the machine parameters of the parameter set that was created in advance can be automatically acquired by means of the sensor system 2 and then stored. The most recently used machine parameters are expediently stored automatically.

Especially expedient is an automated setup of the road paver by means of the correspondingly formed and implemented actuating system 3, e.g., hydraulics, whereby the machine parameters are automatically read out and implemented. The actuating system can consequently adjust, for example, the paving driving speed V, the rotational speed of the longitudinal conveyor 25 and the lateral distribution auger 29, but also the frequency and/or lift of the compacting unit 30, the frequency of the compacting unit 31 and/or the frequency or the hydraulic pressure of the compacting unit 32, as well as the screed assist and/or the levelling cylinders 28.

The invention claimed is:

1. Method for laying down a pavement at a construction site with at least one road paver having a controller,
a longitudinal conveyor,
a lateral distribution auger on a chassis of the road paver,
a distribution auger height position setting actuating system,
a screed including compacting units,
screed drawbars coupled to pivot points on the chassis,
and levelling cylinders for adjusting the height of the pivot points on the chassis with a levelling cylinder actuating system,
the method comprising creating and storing at least one machine parameter set in advance based on known or supplied construction site specifications or paving requirements for a pre-adjustment of the road paver to provide a predetermined paving specification that is determined before the paving is deposited,
acquiring actual machine parameters with a sensor system on the road paver and coordinating the acquired actual machine parameters with the machine parameters of the machine parameter set created in advance,
pre-adjusting the road paver before paving is deposited with the pre-adjustment on the basis of the machine parameter set created in advance with implementation of the parameter set created in advance;
reading out the parameters of the machine parameter set created in advance in the road paver,
automatically implementing the machine parameter set created in advance using an actuating system correlated with the acquired actual machine parameters,
storing the implemented machine parameters of the machine parameter set created in advance in the road paver, and
laying down the pavement after pre-adjusting the road paver.

2. The method according to claim 1 which comprises transmitting the implemented machine parameter set to at least one additional road paver of the same type located at the same construction site as the road paver.

3. The method according to claim 2 which comprises comparing parameter sets that are transmitted among two or more road pavers at a construction site or transmitted back to a planning office with reference to information acquired on machine efficiency or pavement quality,
 determining on the basis of the comparisons at least one optimised parameter set for the paving requirements and providing the parameter set for similar or identical further road pavers for implementation with the predetermined paving specification.

4. The method according to claim 1 which comprises creating the parameter set in advance, and implementing the parameter set created in advance on the road paver, by pre-adjusting the road paver before the road paving operation begins.

5. The method according to claim 1 which comprises creating a plurality of different retrievable parameter sets in advance and storing the parameter sets in a controller of the respective road paver or in an administration server that communicates with the road paver.

6. The method according to claim 1 which comprises creating a parameter set for at least one of the machine parameters selected from the group consisting of the paving profile, the paving width, adjustments of compacting units of a screed of the road paver, the rotational speed or speed of a longitudinal conveyor, the rotational speed of a lateral distribution auger of the road paver, the paving working speed, the distribution auger height position, and the position of the levelling cylinders respectively on the chassis of the road paver.

7. The method according to claim 6 which comprises providing the created parameter set with information including at least one member of the group consisting of road paver type, screed type, an associated parameter set name, or an intended use.

8. The method of claim 1 wherein the at least one machine parameter comprises defining on the chassis of the road paver the height positions of a lateral distribution auger and levelling cylinders of a paving screed of the road paver to be pre-adjusted.

9. Method for laying down a pavement at a construction site with at least one road paver which comprises
 creating and storing at least one machine parameter set in advance based on known or supplied construction site specifications or paving requirements for use in adjusting the road paver to provide a predetermined pavement specification that is implemented before the pavement is deposited,
 adjusting the road paver before the pavement is deposited to implement on the road paver the machine parameter set created in advance,
 transmitting the implemented machine parameter set created in advance to at least one additional road paver of the same type located at the same construction site as the road paver, and
 depositing the pavement with the road paver according to the predetermined pavement specification.

\* \* \* \* \*